(12) United States Patent
Hsieh

(10) Patent No.: US 12,453,074 B2
(45) Date of Patent: Oct. 21, 2025

(54) MEMORY CIRCUIT, DYNAMIC RANDOM ACCESS MEMORY AND OPERATION METHOD THEREOF

(71) Applicant: eRaytroniks Co., Ltd., Kaohsiung (TW)

(72) Inventor: E Ray Hsieh, Taoyuan (TW)

(73) Assignee: eRaytroniks Co., Ltd., Kaohsiung (TW)

( * ) Notice: Subject to any disclaimer, the term of this patent is extended or adjusted under 35 U.S.C. 154(b) by 152 days.

(21) Appl. No.: 18/485,324

(22) Filed: Oct. 12, 2023

(65) Prior Publication Data

US 2024/0138140 A1 Apr. 25, 2024
US 2024/0237328 A9 Jul. 11, 2024

Related U.S. Application Data

(60) Provisional application No. 63/380,745, filed on Oct. 24, 2022.

(30) Foreign Application Priority Data

Sep. 13, 2023 (TW) .................................. 112134946

(51) Int. Cl.
*G11C 11/00* (2006.01)
*G11C 11/405* (2006.01)
(Continued)

(52) U.S. Cl.
CPC ............ *H10B 12/00* (2023.02); *G11C 11/405* (2013.01); *G11C 11/406* (2013.01); *G11C 11/4096* (2013.01)

(58) Field of Classification Search
CPC ... G11C 11/412; G11C 11/39; G11C 11/4023; G11C 11/409; G11C 2211/5614;
(Continued)

(56) References Cited

U.S. PATENT DOCUMENTS 6,208,555 B1 * 3/2001 Noble .................... G11C 11/412
365/72
10,804,275 B2 * 10/2020 El Dirani ............. H10D 12/211
(Continued)

FOREIGN PATENT DOCUMENTS

JP 2009-060100 A 3/2009
TW 200834886 8/2008
(Continued)

OTHER PUBLICATIONS

S. Yu et al., "RRAM for Compute-in-Memory: From Inference to Training," in IEEE Transactions on Circuits and Systems I: Regular Papers, vol. 68, No. 7, pp. 2753-2765, Jul. 2021.
(Continued)

*Primary Examiner* — Thong Q Le
(74) *Attorney, Agent, or Firm* — CKC & Partners Co., LLC

(57) ABSTRACT

The present disclosure provides a dynamic random access memory, which includes a storage diode and a control-FET. The storage diode is composed of a gate-floating FET, and two source/drains of the gate-floating FET serve as a cathode and an anode of the storage diode. The control FET is electrically connected to the cathode or the anode of the storage diode.

13 Claims, 3 Drawing Sheets

(51) Int. Cl.
*G11C 11/406* (2006.01)
*G11C 11/4096* (2006.01)
*H10B 12/00* (2023.01)

(58) Field of Classification Search
CPC ............ G11C 13/0004; G11C 13/0023; G11C 13/004; G11C 13/0069; G11C 17/12; G11C 2213/71; G11C 5/02; G11C 5/06; G11C 7/10; H10B 12/01; H10B 12/10; H10B 12/20; H10B 12/50; H10B 43/30; H10B 63/20; H10B 63/30; H10B 63/32; H10B 63/84; H10B 99/00
See application file for complete search history.

(56) References Cited

U.S. PATENT DOCUMENTS

| | | |
|---|---|---|
| 2006/0279985 A1 | 12/2006 | Keshavarzi et al. |
| 2009/0022001 A1 | 1/2009 | Morishita et al. |
| 2009/0311845 A1 | 12/2009 | Tang et al. |
| 2010/0159650 A1 | 6/2010 | Song et al. |
| 2018/0122943 A1 | 5/2018 | Han et al. |
| 2019/0074050 A1 | 3/2019 | Lacord et al. |
| 2019/0267381 A1 | 8/2019 | Cho et al. |
| 2022/0208254 A1 | 6/2022 | Sakui et al. |

FOREIGN PATENT DOCUMENTS

| | | |
|---|---|---|
| WO | 2007/099623 A1 | 9/2007 |
| WO | 2022/137563 A1 | 6/2022 |

OTHER PUBLICATIONS

W. J. Gallagher et al., "22nm STT-MRAM for Reflow and Automotive Uses with High Yield, Reliability, and Magnetic Immunity and with Performance and Shielding Options," 2019 IEEE International Electron Devices Meeting (IEDM), 2019, pp. 2.7.1-2.7.4.

K. C. Huang et al., "A high-performance, high-density 28nm eDRAM technology with high-K/metal-gate," 2011 International Electron Devices Meeting, 2011, p. 24.7.1-24.7.4.

R. Giterman et al., "A 1-Mbit Fully Logic-Compatible 3T Gain-Cell Embedded DRAM in 16-nm FinFET," in IEEE Solid-State Circuits Letters, vol. 3, pp. 110-113, 2020.

F. Hamzaoglu et al., "13.1 A 1Gb 2GHz embedded DRAM in 22nm tri-gate CMOS technology," 2014 IEEE International Solid-State Circuits Conference Digest of Technical Papers (ISSCC), 2014, pp. 230-231.

C. Pei et al., "0.026 μm2 high performance Embedded DRAM in 22nm technology for server and SOC applications," 2014 IEEE International Electron Devices Meeting, 2014, pp. 19.4.1-19.4.4.

R. Liu, et al., "Improving Fairness for SSD Devices through DRAM Over-Provisioning Cache Management," in IEEE Transactions on Parallel and Distributed Systems, vol. 33, No. 10, pp. 2444-2454, Oct. 1, 2022.

S. Xie, et al., "Gain-Cell CIM: Leakage and Bitline Swing Aware 2T1C Gain-Cell eDRAM Compute in Memory Design with Bitline Precharge DACs and Compact Schmitt Trigger ADCs," 2022 IEEE Symposium on VLSI Technology and Circuits, 2022, pp. 112-113.

A. Olgun et al., "QUAC-TRNG: High-Throughput True Random No. Generation Using Quadruple Row Activation in Commodity DRAM Chips," International Symposium on Computer Architecture (ISCA), 2021, pp. 944-957, arXiv:2105.08955v2.

J. Miskelly et al., "Fast DRAM PUFs on Commodity Devices," in IEEE Transactions on Computer-Aided Design of Integrated Circuits and Systems, vol. 39, No. 11, pp. 3566-3576, Nov. 2020.

\* cited by examiner

MEMORY CIRCUIT, DYNAMIC RANDOM ACCESS MEMORY AND OPERATION METHOD THEREOF

RELATED APPLICATIONS

This application claims priority to U.S. Provisional Patent Application No. 63/380,745, filed Oct. 24, 2022 and Taiwan Patent Application No. 112134946, filed Sep. 13, 2023, the entirety of which is herein incorporated by reference.

BACKGROUND

Field of Invention

The present invention relates to storage circuits and operation methods, and more particularly, a memory circuit, a dynamic random access memory and an operating method thereof.

Description of Related Art

With rapid progress of the Moore's law, variant emerging embedded memories have been in mass-production in foundry. In many application fields, semiconductor memory is widely used in various electronic products.

However, 1T1C embedded DRAM (eDRAM) has stopped development beyond the development of more advanced processes due to increase in cost and difficulty for high-aspect-ratio stacking-capacitor technology with more masks in the back-end-of-line (BEOL). Therefore, for the above reasons, a new dynamic random access memory is needed to adapt to the increasingly miniaturized manufacturing process.

SUMMARY

In one or more various aspects, the present disclosure is directed to a memory circuit, a dynamic random access memory and an operating method thereof.

One embodiment of the present disclosure is related to a dynamic random access memory, which includes a storage diode and a control FET. The storage diode consists of a gate-floating FET (field-effect transistor), where two source/drains of the gate-floating FET serve as a cathode and an anode of the storage diode. The control FET is electrically connected to the cathode or the anode of the storage diode.

In one embodiment of the present disclosure, the control FET includes a first gate, a first source/drain region, a second source/drain region, a first channel region and a first channel region. The first source/drain region and the second source/drain region are disposed at opposite sides of the first gate. The first channel region is disposed between the first source/drain region and the second source/drain region. The first dielectric layer region is disposed between the first gate and the first channel region.

In one embodiment of the present disclosure, the control FET and the storage diode share the second source/drain region, and the storage diode includes a second gate, a second source/drain region, a third source/drain region, a second channel region and a second dielectric layer region. The second source/drain region and the third source/drain region are disposed at opposite sides of the second gate. The second channel region is disposed between the second source/drain region and the third source/drain region. The second dielectric layer region is disposed between the second gate and the second channel region.

In one embodiment of the present disclosure, the third source/drain region is electrically connected to a source line, and the second gate is floated.

In one embodiment of the present disclosure, the first source/drain region is electrically connected to a bit line, and the first gate is electrically connected to a word line.

Another embodiment of the present disclosure is related to a memory circuit, which includes a plurality of memory units arranged in an array, each of the memory units includes a dynamic random access memory, and the dynamic random access memory includes a control FET and a storage diode. The control FET has a gate electrically connected to a word line. The storage diode consists of a gate-floating FET, where two opposite ends of the storage diode are electrically connected to a source line and one end of the control FET respectively, and another end of the control FET is electrically connected to a bit line.

In one embodiment of the present disclosure, each of the memory units further includes another dynamic random access memory, and the another dynamic random access memory includes another control FET and another storage diode, where said another control FET has a gate electrically connected to another word line, said another storage diode consisting of another gate-floating FET, wherein two opposite ends of the another storage diode are electrically connected to another source line and one end of the another control FET respectively, and another end of the another control FET is electrically connected to the bit line.

Another embodiment of the present disclosure is related to an operation method of a dynamic random access memory, and the dynamic random access memory includes a storage diode and a control FET connected in series, and the storage diode consists of a gate-floating FET. The operation method comprising steps of: when writing the dynamic random access memory, applying a control voltage to a word line, applying a writing voltage to a bit line, and applying a zero voltage to a source line, wherein a gate of the control FET is electrically connected to the word line, two opposite ends of the storage diode are electrically connected to the source line and one end of the control FET respectively, and another end of the control FET is electrically connected to the bit line.

In one embodiment of the present disclosure, the control voltage turns on the control FET, and the writing voltage causes the storage diode to generate a Zener tunneling mechanism, so that the storage diode stores charge.

In one embodiment of the present disclosure, the operation method further includes steps of: when refreshing the dynamic random access memory, applying the control voltage to the word line, applying the writing voltage to the bit line, and applying the zero voltage to the source line.

In one embodiment of the present disclosure, the operation method further includes steps of: when reading the dynamic random access memory, applying the control voltage to the word line, applying a read voltage to the source line, and sensing a read current through the bit line.

In one embodiment of the present disclosure, a polarity of the read voltage is opposite to a polarity of the writing voltage.

Technical advantages are generally achieved, by embodiments of the present disclosure. With the technical solution of the present disclosure, the dynamic random access memory is a capacitor-free 1T1D eDRAM that can be fully fabricated by pure foundry FET technology in the front-end-of-line with neither extra masks nor additional materials and layout of capacitor in the BEOL, which dramatically reduces cost and design complexity.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
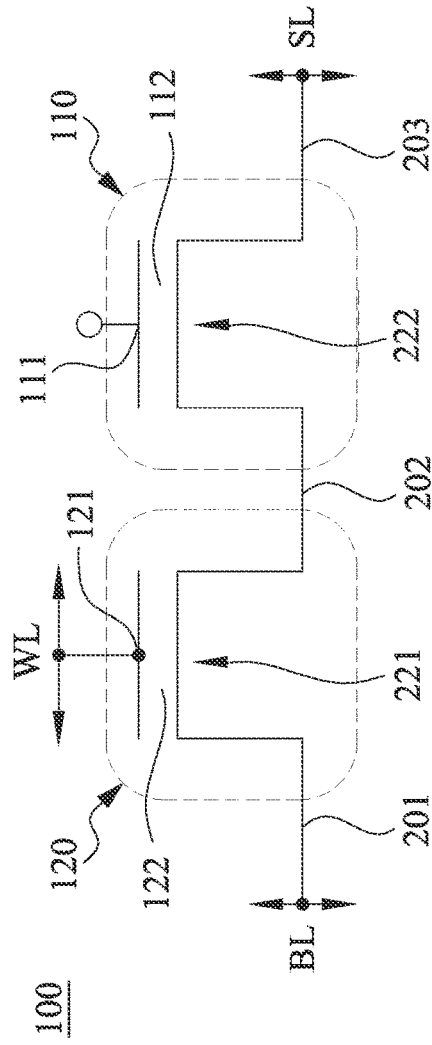
FIG. 1 is a circuit diagram of a dynamic random access memory according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, in one aspect, the present disclosure is directed to dynamic random access memory (DRAM) 100. This dynamic random access memory may be easily integrated into the logic and memory technology platform and may be applicable or readily adaptable to all technologies. Accordingly, the dynamic random access memory 100 has advantages. Herewith the dynamic random access memory 100 is described below with FIG. 1.

The subject disclosure provides the dynamic random access memory 100 in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

FIG. 1 is a circuit diagram of a dynamic random access memory 100 according to one embodiment of the present disclosure. As shown in FIG. 1, the dynamic random access memory 100 includes a storage diode 110 and a control FET 120 connected in series with each other. In structure, the storage diode 110 consists of a gate-floating FET. Thus, the dynamic random access memory 100 can be a capacitor-free 1T1D eDRAM that can be fully fabricated by pure foundry FET technology in the front-end-of-line with neither extra masks nor additional materials and layout of capacitor in the BEOL, which dramatically reduces cost and design complexity.

In terms of application, above-mentioned eDRAM technology of the present disclosure shortens latency between on-chip SRAM/registers and on-DIMM DRAM to reduce memory-wall and balance cost and performance for extensive possible applications.

In practice, for example, the gate-floating FET can be an N-channel gate-floating FET or a P-channel gate-floating FET. The control FET 120 can be an N-channel control FET or a P-channel control FET. In order to simplify the description below, an N-channel FET is used as an example. Those with ordinary skilled in the art can know the properties and electrical differences between the N-channel FET and the P-channel FET, so they will not be described again.

In FIG. 1, the first gate 121 of the control FET 120 is electrically connected to the word line WL, two opposite ends of the storage diode 110 are electrically connected to the source line SL and one end of the control FET 120, and another end of the control FET 120 is electrically connected to the bit line BL.

Moreover, it should be noted that in the embodiments and the scope of the present disclosure, the description related to "electrical connection" can generally refer to one component being indirectly electrically coupled to another component through intervening components, or a component is directly electrically connected to another component, there are no intervening components present.

Regarding the architecture of the storage diode 110, in some embodiments of the present disclosure, the storage diode 110 consists of a gate-floating FET, and the second source/drain region 202 and the third source/drain region 203 of the gate-floating FET are used as an anode and a cathode of the storage diode 110 respectively. The control FET 120 is electrically connected to the cathode or the anode of storage diode 110. The second channel region 222 is disposed between the second source/drain region 202 and the third source/drain region 203, and the second dielectric layer region 112 is disposed between the second gate 111 and the second channel region 222. In practice, for example, the gate-floating FET that constitutes storage diode 110 can be an N-channel gate-floating FET; therefore, the second source/drain region 202 serves as the anode of storage diode 110, and the third source/drain region 203 serves as the cathode of storage diode 110.

Regarding the architecture of the control FET 120, in some embodiments of the present disclosure, the control FET 120 and the storage diode 110 share the second source/drain region 202. The first source/drain region 201 of control FET 120 is electrically connected to bit line BL, the second source/drain region 202 of control FET 120 is electrically connected to storage diode 110, the first channel region 221 is disposed between the first source/drain region 201 and the second source/drain region 202, and the first dielectric layer region 122 Located between first gate 121 and first channel region 221. In practice, for example, the control FET 120 can be an N-channel control FET; therefore the first source/drain region 201 of the N-channel control FET is the drain, and the second source/drain region 202 of the N-channel control FET is the source.

Figure 2:
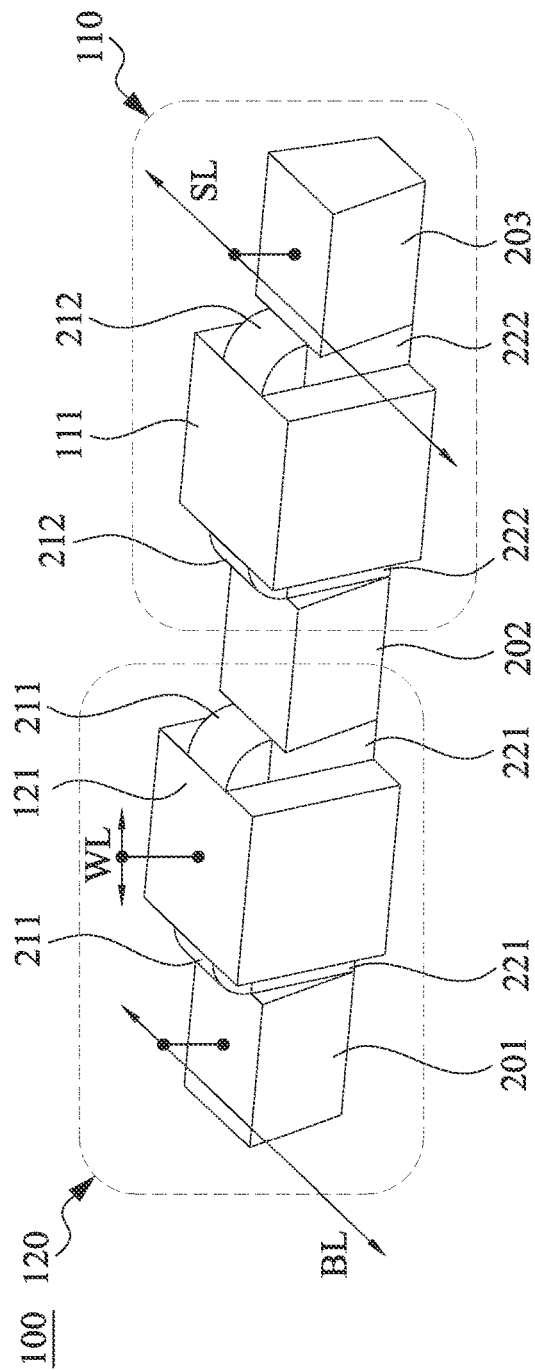
FIG. 2 is a three-dimensional architecture diagram of a dynamic random access memory according to one embodiment of the present disclosure.

For a more complete understanding of the overall architecture of the dynamic random access memory 100, refer to FIG. 1 and FIG. 2. FIG. 2 is a three-dimensional architecture diagram of a dynamic random access memory according to one embodiment of the present disclosure. As shown in FIG. 2, the first source/drain region 201 and the second source/drain region 202 are disposed at two opposite sides of the first gate 121 respectively, and the second source/drain region 202 and the third source/drain region 203 are disposed at two opposite sides of the second gate 111 respectively. The control FET 120 and the storage diode 110 share the second source/drain region 202. As shown in FIG. 2, in practice, for example, the control FET 120 can be one control FinFET, the storage diode 110 can be consist of a gate-floating FinFET, but the present disclosure is not limited thereto.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Regarding the architecture of the control FET 120, in some embodiments of the present disclosure, the control FET 120 includes a first gate 121, a first source/drain region 201, a second source/drain region 202, a spacer 211 and a first channel region 221 (e.g., a three-dimensional fin channel). Architecturally, the spacers 211 are disposed on opposite sides of the first gate 121, and the first channel region 221 is physically connected to the first source/drain region 201 and the second source/drain region 202.

Regarding the architecture of the storage diode 110, in some embodiments of the present disclosure, the storage diode 110 includes a second gate 111, a second source/drain region 202, a third source/drain region 203, spacer 212 and a second channel region 222 (e.g., a three-dimensional Fin channel). Architecturally, the spacers 212 are disposed on opposite sides of the second gate 111, and the second channel region 222 is physically connected to the second source/drain region 202 and the third source/drain region 203.

In some embodiments of the present disclosure, the third source/drain region 203 is electrically connected to the source line SL, the second gate 111 is floated, the first source/drain region 201 is electrically connected to the bit line BL, and the first gate 121 is electrically connected to the word line WL.

Figure 3:
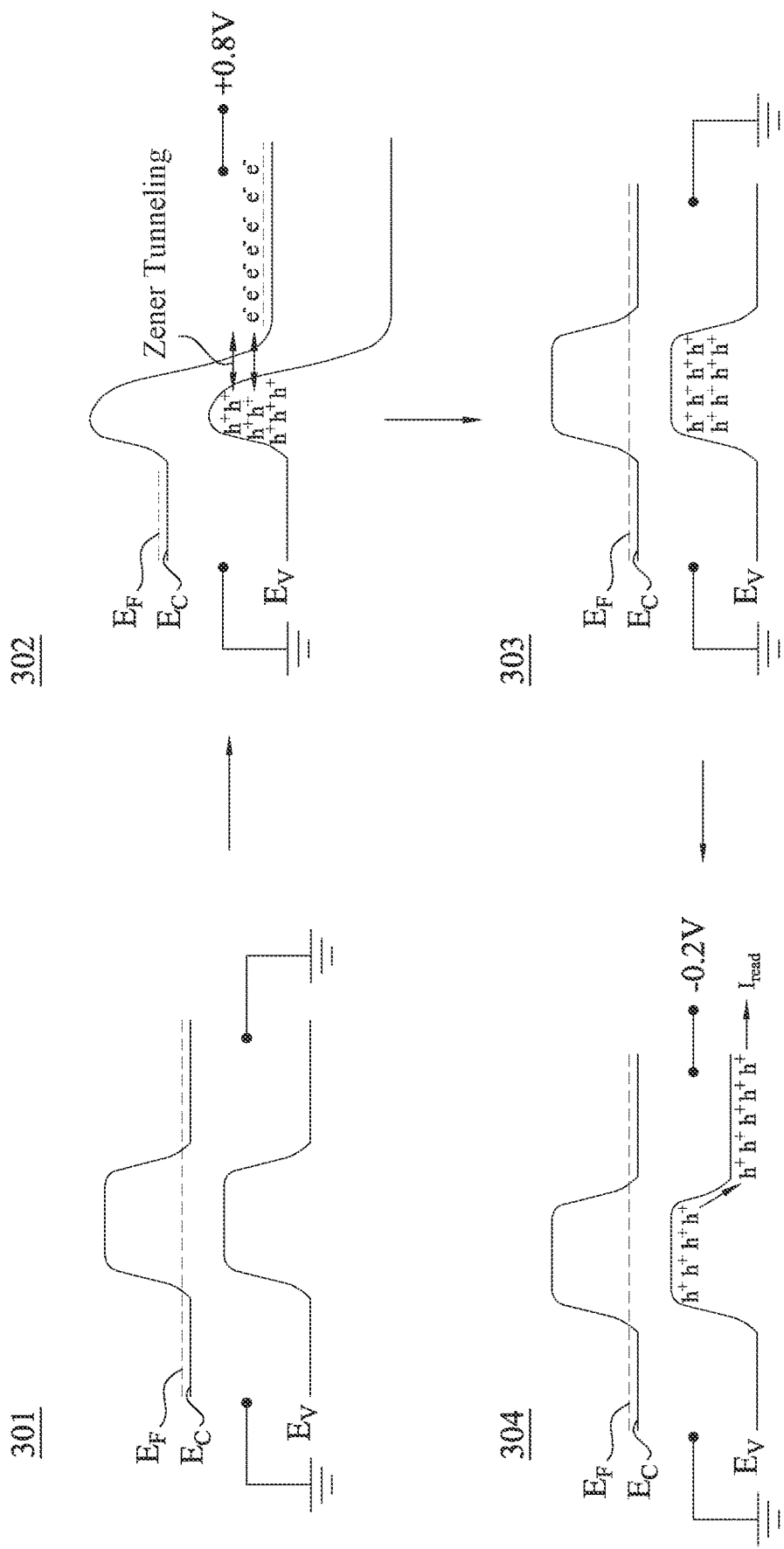
FIG. 3 is a band-gap diagram of an operation method of a dynamic random access memory according to one embodiment of the present disclosure.

Regarding the operation method of the dynamic random access memory 100, refer to FIG. 1 to FIG. 3. FIG. 3 is a band-gap diagram of an operation method of a dynamic random access memory according to one embodiment of the present disclosure.

In the initial stage 301, the dynamic random access memory 100 is not selected, and the zero voltage is applied to word line WL, the bit line BL and the source line SL. At this time, the conduction band EC, the Fermi level EF and the valence band EV are all stable, and the control FET 120 is kept in the cut-off state, thereby effectively preventing the leakage current.

In the writing stage 302, when the dynamic random access memory 100 is written, a control voltage is applied to the word line WL, a writing voltage is applied to the bit line BL, and a zero voltage is applied to the source line SL. The control voltage turns on the control FET 120, and the writing voltage causes the storage diode 110 to undergo a Zener tunneling mechanism, so that the storage diode 110 can store charge.

In some embodiments of the present disclosure, the control FET 120 can be an N-channel FET, the storage diode 110 can be composed of an N-channel gate-floating FET, and the second source/drain region 202 is an $N^{++}$ doped region (e.g., a heavily doped region), the second channel region 222 is a $P^-$ doped region (e.g., a lightly doped region), and the third source/drain region 203 is an $N^{++}$ doped region, so as to facilitate the Zener tunneling mechanism. In writing stage 302, the control voltage (e.g., about +0.8V) turns on the control FET 120. When the Zener tunneling mechanism occurs in the storage diode 110, the electrons $e^-$ is pulled out by the control voltage (e.g., about +0.8V), which creates excess charge-amount (i.e., electron holes $h^+$) stored in the second channel region 222 (e.g., a three-dimensional Fin channel).

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

In the holding stage 303, the charge-amount (e.g., electron holes $h^+$) is temporarily stored in the second channel region 222 (e.g., a three-dimensional Fin channel). In some embodiments of the present disclosure, the dynamic random access memory 100 can be refreshed regularly, where the refreshing voltage and the writing voltage can be the same. The above control voltage is applied to the word line WL, the writing voltage is applied to the bit line BL, and the zero voltage is applied to the source line SL. It should be noted that the refreshing operation means that in the dynamic random access memory 100, the information stored in the dynamic random access memory 100 will pass over time, and it is necessary to periodically rewrite the information back to the dynamic random access memory 100 within a predetermined time to maintain the electrical properties of the original stored information, so as to prevent the information stored in the dynamic random access memory 100 from being lost.

In the read stage 304, when the dynamic random access memory 100 read, the control voltage is applied to word line WL, the read voltage is applied to source line SL, and the read current $I_{read}$ is sensed through bit line BL.

In some embodiments of the present disclosure, the control FET 120 can be an N-channel FET, the storage diode 110 can be composed of an N-channel gate-floating FET, and the second source/drain region 202 is an $N^{++}$ doped region (e.g., a heavily doped region), the second channel region 222 is a $P^-$ doped region (e.g., a lightly doped region), and the third source/drain region 203 is an $N^{++}$ doped region. In other words, each of the doping concentrations of the second and third source/drain regions 202 and 203 is greater than the doping concentration of the second channel region 222. In the read stage 304, the control voltage (e.g., about +0.8V) turns on the control FET 120, and the read voltage (e.g., about −0.2V) attracts the electron holes $h^+$ to form read current $I_{read}$.

In some embodiments of the present disclosure, the polarity of the read voltage of the read stage 304 is opposite to the polarity of the writing voltage of the writing stage 302, thereby stably operating the writing/reading of the dynamic random access memory 100. In practice, for example, the storage diode 110 can be composed of an N-channel gate-floating FET. The read voltage is about −0.2V and the write voltage is about +0.8V.

Figure 4:
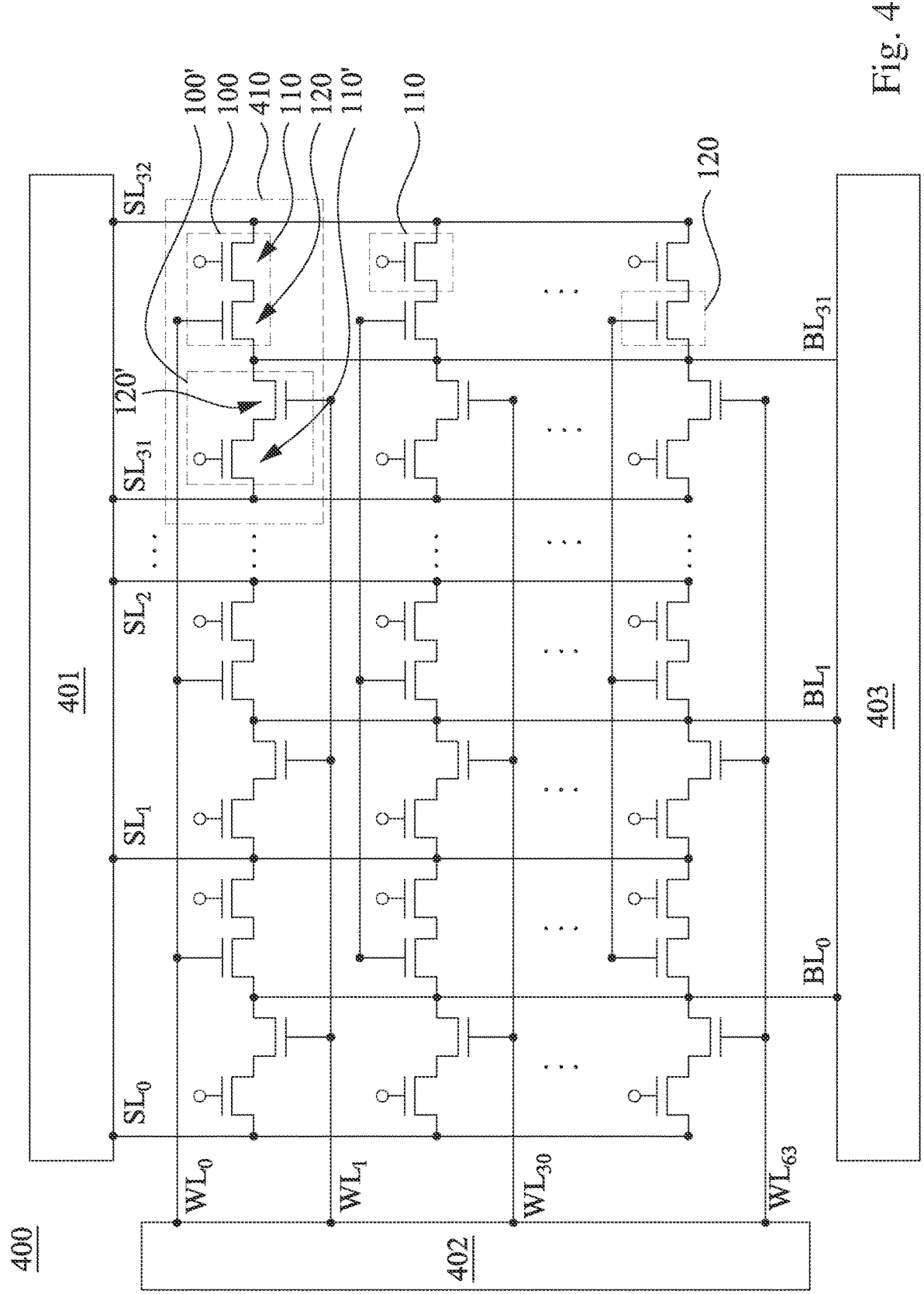
FIG. 4 is an equivalent circuit diagram of a memory circuit according to one embodiment of the present disclosure.

For a more complete understanding of an array composed of the dynamic random access memories 100, refer to FIG. 1 to FIG. 4. FIG. 4 is an equivalent circuit diagram of a memory circuit 400 according to one embodiment of the present disclosure. As shown in FIG. 4, the memory circuit 400 includes a plurality of memory units 410 arranged in an array, and each memory unit 410 has the same structure. Taking the corner memory unit 410 as an example, it may include dynamic random access memory 100 and dynamic random access memory 100'. In practice, for example, the dynamic random access memory 100 in FIG. 1 is essentially the same as the dynamic random access memory 100 in FIG. 4, and the dynamic random access memory 100 and the dynamic random access memory 100' are symmetrical to each other.

In FIG. 4, the dynamic random access memory 100 includes the control FET 120 and the storage diode 110. The gate of control FET 120 is electrically connected to word line $WL_0$. The storage diode 110 is composed of a gate-floating FET. Two opposite ends of storage diode 110 are electrically connected to source line $SL_{32}$ and one end of control FET 120, and another end of the control FET 120 is electrically connected to bit line $BL_{31}$.

Similarly, in FIG. 4, the dynamic random access memory 100' includes a control FET 120' and a storage diode 110'. The gate of control FET 120' is electrically connected to the word line $WL_1$, and the storage diode 110' is composed of a gate-floating FET. Two opposite ends of the storage diode 110' are electrically connected to source line $SL_{31}$ and one end of control FET 120', and another end of control FET 120' is electrically connected to the bit line $BL_{31}$, and bit line $BL_{31}$ is disposed between the source line $SL_{32}$ and the source line $SL_{31}$.

In FIG. 4, the source lines $SL_0$-$SL_{32}$ are electrically connected to the circuit 401, the word lines $WL_0$-$WL_{63}$ are electrically connected to the circuit 402, and bit lines $BL_0$-$BL_{31}$ are electrically connected to the circuit 403. In some embodiments of the present disclosure, the circuit 401 may include a source line decoder, a source line driver and a controller, the circuit 402 may include a word line decoder and a controller, and the circuit 403 may include a bit line decoder, a controller and a sense-amplifier. In practice, for example, the sense-amplifier in circuit 403 can sense the read current through bit line $BL_{31}$. In addition, for example, the storage diode 110 can be composed of an N-channel gate-floating FET. Then the source line driver of the circuit 401 is a negative voltage source line driver, thereby providing a read voltage (e.g., about –0.2V).

In an experimental example, the memory circuit 400 is designed by a standard Fin transistor with ultra-scaled size of 0.0242 $\mu m^2$. The dynamic random access memory 100 achieves a writing time of less than 7 ns at a writing voltage of 0.8V; the single-core operating voltage (VDD) achieves a read time of less than 7 ns at a read voltage of –0.2V at a clock frequency of approximately 400 MHz. In the holding stage 303, the retention time is 116 $\mu s$ at 25° C. and 101 $\mu s$ at 75° C. The writing power is about 0.4 $\mu W/MHz$, and the read power is about 36.5 nW/MHz.

In view of the above, technical advantages are generally achieved, by embodiments of the present disclosure. With the technical solution of the present disclosure, each of the dynamic random access memories 100 and 100' is a capacitor-free 1T1D eDRAM that can be fully fabricated by pure foundry FET technology in the front-end-of-line with neither extra masks nor additional materials and layout of capacitor in the BEOL, which dramatically reduces cost and design complexity.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A dynamic random access memory, comprising:
   a storage diode consisting of a gate-floating FET (field-effect transistor), wherein two source/drains of the gate-floating FET serve as a cathode and an anode of the storage diode, wherein the storage diode comprises:
     a first gate; and
     a first source/drain region and a second source/drain region disposed at opposite sides of the first gate, wherein the second source/drain region is electrically connected to a source line, and the first gate is floated; and
   a control FET electrically connected to the cathode or the anode of the storage diode.

2. The dynamic random access memory of claim 1, wherein the control FET comprises:
   a second gate; and
   a second source/drain region and a third source/drain region disposed at opposite sides of the second gate.

3. The dynamic random access memory of claim 2, wherein the control FET further comprises:
   a first channel region disposed between the second source/drain region and the third source/drain region; and
   a first dielectric layer region disposed between the second gate and the first channel region.

4. The dynamic random access memory of claim 3, wherein the control FET and the storage diode share the second source/drain region.

5. The dynamic random access memory of claim 1, wherein the storage diode further comprises:
   a second channel region disposed between the first source/drain region and the second source/drain region; and
   a second dielectric layer region disposed between the first gate and the second channel region.

6. The dynamic random access memory of claim 2, wherein the second source/drain region is electrically connected to a bit line, and the second gate is electrically connected to a word line.

7. A memory circuit, comprising:
   a plurality of memory units arranged in an array, each of the memory units comprising a dynamic random access memory, and the dynamic random access memory comprising:
     a control FET having a gate electrically connected to a word line; and
     a storage diode consisting of a gate-floating FET, wherein two opposite ends of the storage diode are electrically connected to a source line and one end of the control FET respectively, and another end of the control FET is electrically connected to a bit line.

8. The memory circuit of claim 7, wherein each of the memory units further comprises another dynamic random access memory, and the another dynamic random access memory comprises:
   another control FET having a gate electrically connected to another word line; and
   another storage diode consisting of another gate-floating FET, wherein two opposite ends of the another storage diode are electrically connected to another source line and one end of the another control FET respectively, and another end of the another control FET is electrically connected to the bit line.

9. An operation method of a dynamic random access memory, the dynamic random access memory comprising a storage diode and a control FET connected in series, and the storage diode consisting of a gate-floating FET, and the operation method comprising steps of:
   when writing the dynamic random access memory, applying a control voltage to a word line, applying a writing voltage to a bit line, and applying a zero voltage to a source line, wherein a gate of the control FET is electrically connected to the word line, two opposite ends of the storage diode are electrically connected to the source line and one end of the control FET respectively, and another end of the control FET is electrically connected to the bit line.

10. The operation method of claim 9, wherein the control voltage turns on the control FET, and the writing voltage causes the storage diode to generate a Zener tunneling mechanism, so that the storage diode stores charge.

11. The operation method of claim 9, further comprising:
when refreshing the dynamic random access memory, applying the control voltage to the word line, applying the writing voltage to the bit line, and applying the zero voltage to the source line.

12. The operation method of claim 9, further comprising:
when reading the dynamic random access memory, applying the control voltage to the word line, applying a read voltage to the source line, and sensing a read current through the bit line.

13. The operation method of claim 12, wherein a polarity of the read voltage is opposite to a polarity of the writing voltage.

* * * * *